(12) United States Patent
Jolliff et al.

(10) Patent No.: US 6,484,497 B1
(45) Date of Patent: Nov. 26, 2002

(54) NEUTRAL BRAKE

(75) Inventors: Norman E. Jolliff, Salem, IN (US); Richard T. Ruebusch, New Albany, IN (US)

(73) Assignee: Tecumseh Products Company, Tecumseh, MI (US)

( * ) Notice: Subject to any disclaimer, the term of this patent is extended or adjusted under 35 U.S.C. 154(b) by 0 days.

(21) Appl. No.: 09/512,161

(22) Filed: Feb. 24, 2000

(51) Int. Cl.$^7$ ................................................ F15B 15/26
(52) U.S. Cl. ........................ 60/436; 60/442; 91/44; 92/20; 92/22
(58) Field of Search ..................... 60/435, 436, 442; 91/44; 92/20, 22

(56) References Cited

U.S. PATENT DOCUMENTS

| | | | | |
|---|---|---|---|---|
| 2,381,795 A | * | 8/1945 | Willett | 60/436 |
| 3,508,401 A | * | 4/1970 | Alpin | 60/442 |
| 3,593,522 A | * | 7/1971 | Angert | 60/436 |
| 4,449,442 A | * | 5/1984 | Ebbing et al. | 91/44 |
| 4,543,786 A | | 10/1985 | Shuler | 60/435 |
| 4,557,109 A | * | 12/1985 | Nagahara et al. | 60/436 |
| 4,571,941 A | | 2/1986 | Aoyagi et al. | 60/466 |
| 5,031,403 A | * | 7/1991 | Okada | 60/487 |
| 5,094,077 A | | 3/1992 | Okada | 60/436 |
| 5,467,598 A | | 11/1995 | Welscher | 60/436 |

FOREIGN PATENT DOCUMENTS

JP             800119    * 1/1981

* cited by examiner

*Primary Examiner*—F. Daniel Lopez
(74) *Attorney, Agent, or Firm*—Baker & Daniels

(57) ABSTRACT

A neutral brake system for use in a hydrostatic transmission to automatically apply a brake when the hydrostatic transmission is shifted to neutral. The neutral brake system includes a hydraulically-released, spring-activated brake mechanism in direct fluid communication with the main hydraulic passages which form a hydraulic circuit between the pump and the motor. When the hydrostatic transmission is shifted to neutral, a brake spring biases a brake lever into contact with a pair of friction pads to engage a brake disk splined to the output shaft of the motor to stop the vehicle. When the hydrostatic transmission is shifted out of neutral, a charge of hydraulic pressure within the hydraulic circuit causes a piston within a brake release chamber to override the biasing force of the brake spring, and to urge the brake lever out of contact with the friction pads such that the friction pads are disengaged from the brake disk, and the output shaft of the output shaft of the motor may freely rotate. A throttling orifice is provided in the hydraulic circuit to restrict hydraulic flow from the brake release chamber to prevent abrupt engaging of the brake mechanism when the transmission is shifted to neutral.

4 Claims, 2 Drawing Sheets

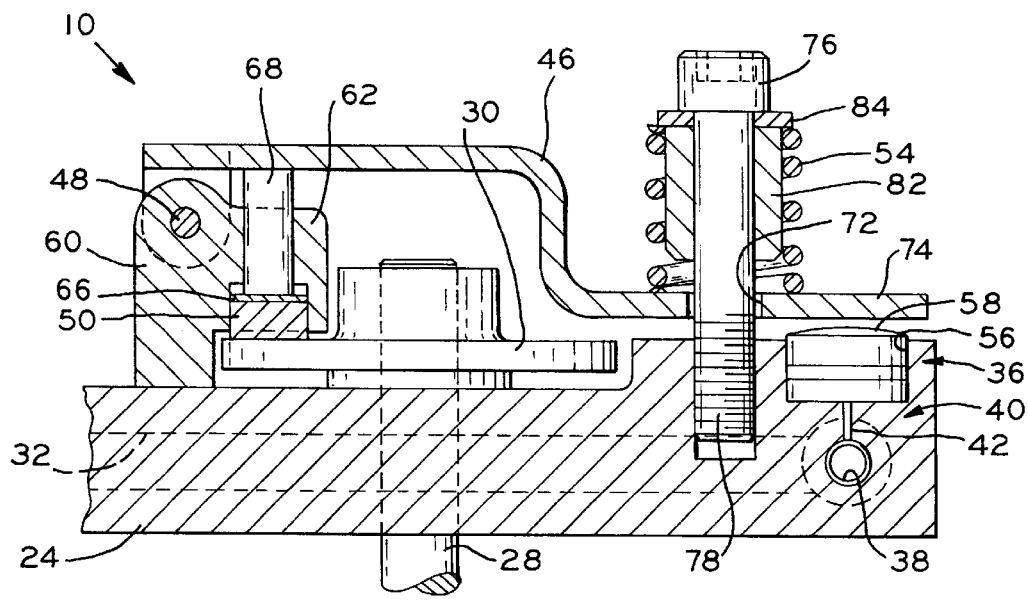
FIG_3
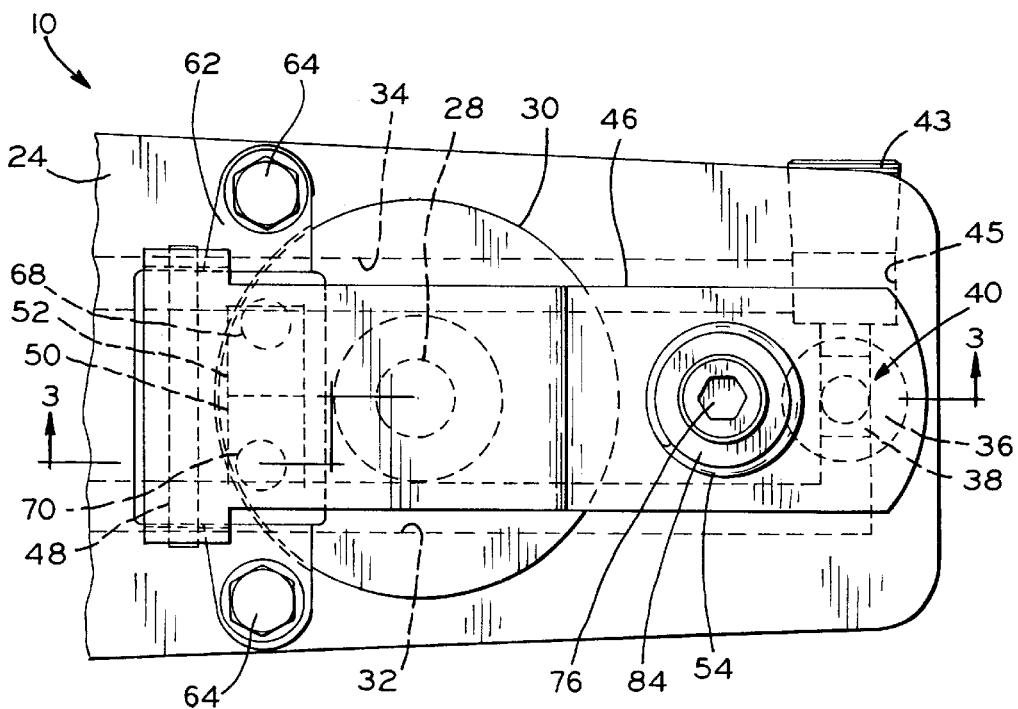
FIG_2

NEUTRAL BRAKE

BACKGROUND OF THE INVENTION

1. Field of the Invention

The present invention relates to hydrostatic transmissions intended primarily for use in the lawn and garden industry on riding lawn mowers, lawn and garden tractors and the like, but may also be applied to larger implements and vehicles. More particularly, the present invention relates to a neutral brake system for a hydrostatic transmission to automatically apply a brake when the transmission is shifted to neutral.

2. Description of the Related Art

Hydrostatic transmissions transmit rotary mechanical motion from an internal combustion engine to fluid motion, typically oil or hydraulic fluid, and then back to rotary mechanical motion to rotate a pair of drive axles in order to drive a vehicle. Hydrostatic transmissions generally include a pump, such as a variable displacement pump, driven by the engine. The pump drives a motor, such as a fixed displacement motor, through a hydraulic circuit between the pump and the motor. The output speed of the hydrostatic transmission is typically controlled by varying the displacement of the pump using a movable track ring or swash plate. An example of such a hydrostatic transmission is described in U.S. Pat. No. 5,182,966, assigned to the assignee of the present application, and expressly incorporated herein by reference.

When the hydrostatic transmission is shifted to neutral, the displacement of the pump is zero, there is substantially no hydraulic pressure in the hydraulic circuit, and the motor is idle. When the hydrostatic transmission is shifted out of neutral, the displacement of the pump provides a charge of hydraulic pressure to the hydraulic circuit to drive the motor. The motor in turn drives a pair of drive axles through a reduction gear train and a differential mechanism.

The motor, reduction gear train, differential mechanism, and drive axles are disengaged from the engine when the hydrostatic transmission is shifted to neutral, and, if the vehicle is parked on an inclined surface it will be free to roll downhill. Typically, a user sets a manual parking brake or keeps pressure applied to a foot brake when the transmission is shifted to neutral to prevent the vehicle from rolling downhill.

Problematically, vehicles having hydrostatic transmissions with a manual parking brake and/or a foot brake are dependent upon the user to actuate the brakes to prevent the vehicle from moving when the hydrostatic transmission is shifted to neutral.

Other known hydrostatic transmissions include a hydraulic circuit between a motor and a pump, with the displacement of the pump controlled by a control system such as a hydraulic servo, which may be part of a second hydraulic circuit. Typically, these hydrostatic transmissions also include complex arrangements of servos, multiple valves, and control levers. For example, a user may manually apply or release a hydraulic friction brake after the user first manually actuates a servo and valve control mechanism which destrokes the variable displacement pump to maintain the transmission in a minimum drive condition. Alternatively, a control valve located in a second hydraulic circuit may be responsive to a pilot hydraulic pressure in the main line hydraulic circuit. The control valve in turn controls the hydraulic fluid supply to a hydraulic servo, also located in the second hydraulic circuit, which servo controls the pump, in order to prevent the main line pressure from substantially exceeding a predetermined level.

The foregoing hydrostatic transmissions are disadvantageous because they are complex and require several components such as, for example, a second hydraulic fluid source, servo devices, and multiple control and shuttle valves. Maintenance of such transmissions can also be time-consuming and expensive. Further, such hydrostatic transmissions are not easily retrofittable into existing hydrostatic transmissions.

What is needed is a neutral brake system for a hydrostatic transmission which is automatically engaged to stop the vehicle from moving when the hydrostatic transmission is shifted to neutral.

A further need is for a neutral brake system which does not have a complex design, such that the number and complexity of the components which comprise the brake system is reduced, to simplify and reduce the cost of maintenance.

Still another need is for a neutral brake system which may be easily retrofitted into existing hydrostatic transmissions.

SUMMARY OF THE INVENTION

The present invention is a neutral brake system for use with a hydrostatic transmission to automatically apply a brake when the hydrostatic transmission is shifted to neutral, including a hydraulically-released, spring-activated brake mechanism, the brake mechanism in fluid communication with, and controlled by, the main hydraulic passages which form a hydraulic circuit between the pump and the motor of the hydrostatic transmission.

A brake release cylinder having a piston therein is communicated directly to the closed hydraulic circuit between the pump and the motor by a pair of brake passages via a shuttle valve. When the hydrostatic transmission is shifted to neutral, the hydraulic pressure in the hydraulic circuit is substantially zero, and a brake spring biases a brake lever into contact with a friction pad. The friction pad engages a brake disk splined to the output shaft of the motor to stop rotation of the output shaft, and to thereby stop the vehicle from moving. When the hydrostatic transmission is shifted out of neutral, the pump produces a charge of hydraulic pressure within the hydraulic circuit, and a piston within the brake release cylinder overrides the bias force of the brake spring, and urges the brake lever out of contact with the friction pad to release the brake disk such that the output shaft may freely rotate.

In one form thereof, a brake system in combination with a hydrostatic transmission is provided, the hydrostatic transmission having a hydraulic circuit between a pump and a motor, the brake system including a hydraulically-released, spring-activated brake mechanism in direct fluid communication with the hydraulic circuit, the hydraulic circuit controlling the hydraulic brake mechanism.

In another form thereof, a hydrostatic transmission is provided, including a pump, a motor in fluid communication with the pump, the pump and motor forming a hydraulic circuit, and a hydraulically-released, spring-activated brake mechanism in direct fluid communication with the hydraulic circuit, the hydraulic circuit controlling the hydraulic brake mechanism.

The advantage of this arrangement is that the brake mechanism is automatically engaged when the hydrostatic transmission is shifted to neutral, obviating the need for a user to manually set a parking brake or to keep pressure on a foot brake to stop the vehicle from moving when the hydrostatic transmission is shifted to neutral.

A further advantage of this arrangement is that, because the brake mechanism is in direct fluid communication with the hydraulic circuit so that the number and complexity of the brake mechanism components is substantially reduced, which in turn reduces assembly and maintenance costs.

Still another advantage of this arrangement is that the brake mechanism may be easily retrofitted into existing hydrostatic transmissions.

BRIEF DESCRIPTION OF THE DRAWINGS

The above-mentioned and other features and advantages of this invention, and the manner of attaining them, will become more apparent and the invention itself will be better understood by reference to the following description of an embodiment of the invention taken in conjunction with the accompanying drawings, wherein:

FIG. 2 is a top plan view of the neutral brake mechanism; and

FIG. 3 is a side sectional view taken along the line 3—3 of FIG. 2.

Corresponding reference characters indicate corresponding parts throughout the several views. The exemplification set out herein illustrates a preferred embodiment of the invention, in one form, and such exemplification is not to be construed as limiting the scope of the invention in any manner.

DETAILED DESCRIPTION

Figure 1:
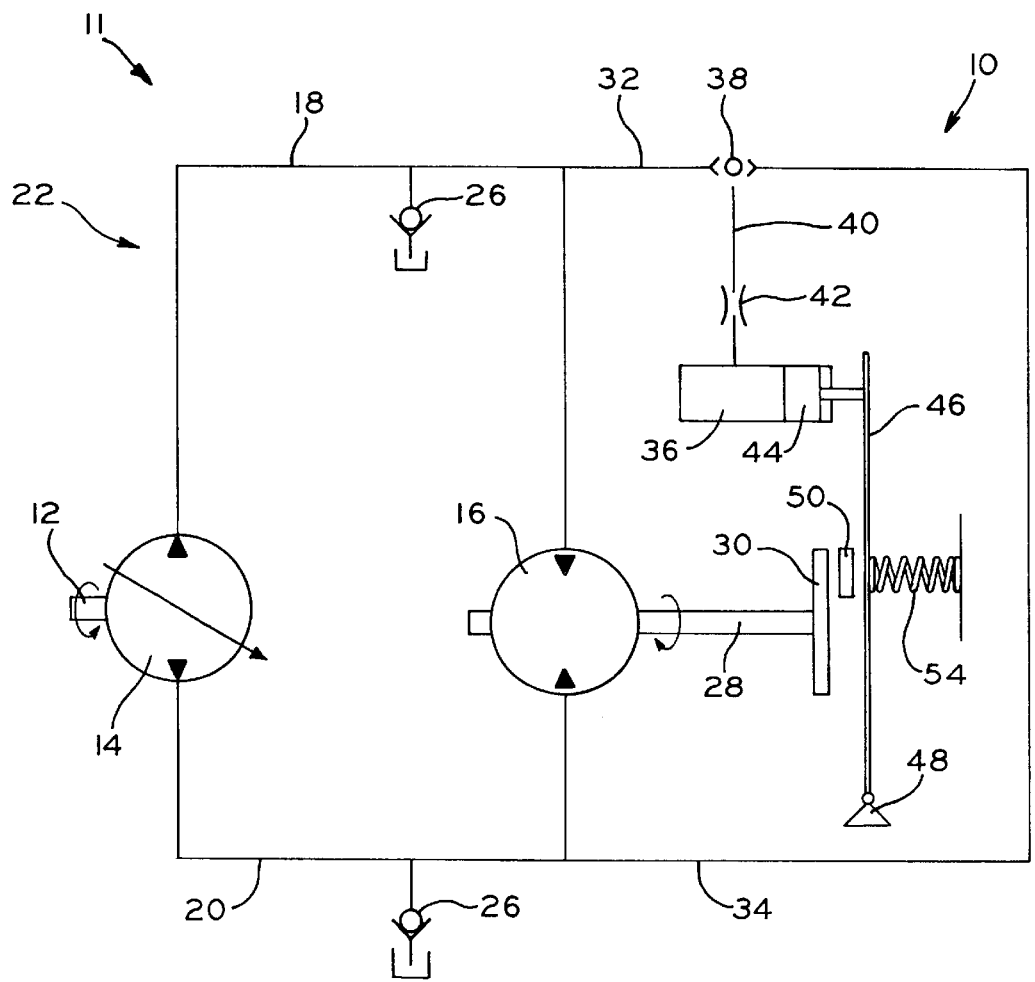
FIG. 1 is a schematic representation of the neutral brake system according to one embodiment of the invention.

Referring to FIG. 1, a brake system 11 is shown schematically, including hydraulic circuit 22 and brake mechanism 10. Brake system 11 is for use with a vehicle having a hydrostatic transmission, such as the hydrostatic transmission disclosed U.S. Pat. No. 5,182,966, or in co-pending application, Ser. No. 60/119,381, titled "HYDROSTATIC TRANSAXLE HAVING AXIAL PISTON MOTOR", filed Feb. 2, 1999, assigned to the assignee of the present application, the disclosures of which are expressly incorporated herein by reference.

Input shaft 12 transmits rotary mechanical motion from an engine (not shown), and drives variable displacement pump 14. Main hydraulic passages 18 and 20 communicate variable displacement pump 14 with fixed displacement motor 16 and form a hydraulic circuit 22 between variable displacement pump 14 and fixed displacement motor 16. Variable displacement pump 14 and fixed displacement motor 16 are mounted to a pump and motor block 24 (shown in FIGS. 2 and 3). Referring again to FIG. 1, the displacement of variable displacement pump 14 may generally be controlled by varying the eccentricity of a track ring or swash plate (not shown), as is conventional. Check valves 26 are connected to main hydraulic passages 18 and 20 to provide make-up oil to the hydraulic circuit.

Fixed displacement motor 16 drives output shaft 28. A brake member in the form of brake disk 30 is splined to output shaft 28 and rotates with output shaft 28. Output shaft 28 is also drivingly connected to an axle mechanism (not shown), the axle mechanism including a reduction gear train (not shown), a differential mechanism (not shown) and a pair of drive axles (not shown).

Forward and reverse brake passages 34 and 32 communicate brake release cylinder 36 directly with hydraulic circuit 22 via a shuttle valve 38 and a connecting passage 40. Connecting passage 40 includes a throttling orifice 42 provided between shuttle valve 38 and brake release cylinder 36 to restrict hydraulic flow between shuttle valve 38 and brake release cylinder 36, as will be described below. Piston 44 is slidably received within brake release cylinder 36, and abuts brake lever 46. Brake lever 46 pivots about pivot point 48, and is urged against friction element or pad 50 by brake spring 54 thereby forming the linkage between piston 44 and friction pad 50.

As shown schematically in FIG. 1, when the hydrostatic transmission is shifted to neutral, there is substantially no hydraulic pressure within hydraulic circuit 22, and brake spring 54 overrides piston 44 and biases brake lever 46 against friction pads 50 and 52. Friction pad 50 frictionally engages brake disk 30 to stop the rotation of output shaft 28, drivingly connected to the axle mechanism, thereby stopping the vehicle. Throttling orifice 42 restricts hydraulic flow from brake release cylinder 36 when the hydrostatic transmission is shifted to neutral to prevent abrupt engagement of brake mechanism 10 by the biasing force of brake spring 54 against brake lever 46.

When the hydrostatic transmission is shifted out of neutral, variable displacement pump 14 produces a charge of hydraulic pressure in hydraulic circuit 22. A relatively lower charge of hydraulic pressure, approximately 100 psi, than the relatively higher charge of hydraulic pressure in closed hydraulic circuit passes through throttling orifice 42 and causes piston 44 to override brake spring 54 and to urge brake lever 46 out of contact with friction pad 50 and to disengage friction pad 50 from brake disk 30, thereby allowing output shaft 28 to be drivingly rotated by fixed displacement motor 16.

Referring to FIGS. 2 and 3, brake mechanism 10 is shown in an engaged position, as when the hydrostatic transmission is shifted to neutral. Brake mechanism 10 is mounted to the pump and motor block 24 of the hydrostatic transmission. Output shaft 28 of fixed displacement motor 16 (shown in FIG. 1) is journalled in a bearing (not shown) carried in pump and motor block 24, and brake disk 30 is splined to the end of output shaft 28 which extends externally of pump and motor block 24. Piston 44 is slidably received in a brake release cylinder bore 56 within pump and motor block 24, and a top portion 58 of piston 44 is disposed proximal to end portion 74 of brake lever 46. Forward and reverse passages 34,32 communicate brake release cylinder 36 with hydraulic circuit 22 (shown in FIG. 1). Connecting passage 40 includes shuttle valve 38 and throttling orifice 42. Plug 43 within access hole 45 may be removed to access shuttle valve 38.

Linkage for actuating brake mechanism 10 may include brake lever 46, which is pivotally mounted upon a pivot shaft 48 rotatably disposed in shoulder portion 60 of brake housing 62. Brake housing 62 is mounted to pump and motor block 24 with bolts 64, and carries a pair of friction pads 50, 52 adjacent brake disk 30. Friction pads 50, 52 include backing plates 66 mounted thereon. Spacers 68, 70 are carried in brake housing 62, between brake lever 46 and friction pads 50, 52.

Brake lever 46 contains aperture 72 through end portion 74, through which stud 76 extends. Stud 76 includes a threaded end portion 78 in screw-threaded engagement in a stud bore 80 in pump and motor block 24, or alternatively, stud 76 may be formed integrally with pump and motor block 24. Collar 82 and washer 84 are disposed around stud 76. Brake spring 54 is coiled about collar 82 between washer 84 and brake lever 46, and biases brake lever 46 toward pump and motor block 24.

When the hydrostatic transmission is shifted to neutral, as shown in FIGS. 2 and 3, the hydraulic pressure within the hydraulic circuit is near 0 psi, and brake spring 54 biases end portion 74 of brake lever 46 toward pump and motor block 24, rotating brake spring about pivot shaft 48. The bias force of brake spring 54 overrides piston 44, and causes end portion 74 of brake lever 46 to push piston 44 into brake release cylinder 56. When thus rotated about pivot shaft 48, brake lever 46 contacts spacers 68, 70 which in turn contact backing plates 66 of friction pads 50, 52 to push friction pads 50, 52 into frictional engagement with brake disk 30 to stop the rotation of output shaft 28.

When the hydrostatic transmission is shifted out of neutral, a charge of hydraulic pressure from the hydraulic circuit passes into brake release cylinder 36 through either forward passage 34 or reverse passage 32, and then through throttling orifice 42 to urge piston 44 against brake lever 46. Piston 44 overrides the biasing force of brake spring 54, causing brake lever 46 to rotate away from pump and motor block 24 about pivot shaft 48, and out of contact with spacers 68, 70, releasing friction pads 50, 52 from frictional engagement with brake disk 30 and allowing output shaft 28 to be drivinly rotated by fixed displacement motor 16 (shown in FIG. 1).

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A brake system in combination with a hydrostatic transmission, said hydrostatic transmission having a hydraulic circuit between a pump and a motor, said hydrostatic transmission disposed in a housing, and said motor including an output shaft having an end extending externally of said housing with a brake disk connected thereto, said brake system comprising:

a hydraulically-released, spring-activated brake mechanism, said brake mechanism in fluid communication with the hydraulic circuit, the hydraulic circuit controlling said brake mechanism, said brake mechanism further comprising:

a brake release cylinder with a piston slidably disposed therein, said brake release cylinder fluidly connected to said hydraulic circuit, said piston extending externally of said housing;

a friction pad carried in said housing adjacent said brake disk;

a brake lever pivotably mounted to said housing, said brake lever disposed adjacent said piston and adjacent said friction pad; and a spring mounted to said housing, said spring biasing said brake lever against said friction pad and said piston.

2. The combination of claim 1, wherein said brake release cylinder is connected to said hydraulic circuit via a shuttle valve.

3. The combination of claim 2, including a throttling orifice connected to said hydraulic circuit between said shuttle valve and said brake release cylinder.

4. A hydrostatic transmission comprising:

a pump;

a motor in fluid communication with said pump, said pump and said motor defining a hydraulic circuit, said pump and said motor disposed in a housing, said motor including an output shaft having an end extending exteriorly of said housing with a brake disk connected thereto;

a hydraulically-released, spring-activated brake mechanism, said brake mechanism in fluid communication with the hydraulic circuit, the hydraulic circuit controlling said brake mechanism, said brake mechanism further comprising:

a cylinder bore in said housing with a piston slidably received in said cylinder bore, said piston extending exteriorly of said housing;

a connecting passage disposed in said housing, said connecting passage fluidly connecting said hydraulic circuit to said cylinder bore;

a friction pad carried in said housing adjacent said brake disk;

a brake lever pivotably mounted to said housing, said brake lever disposed adjacent said piston and adjacent said friction pad; and a spring mounted to said housing, said spring abutting said brake lever and biasing said brake lever against said friction pad and said piston.

* * * * *